Figure 1:
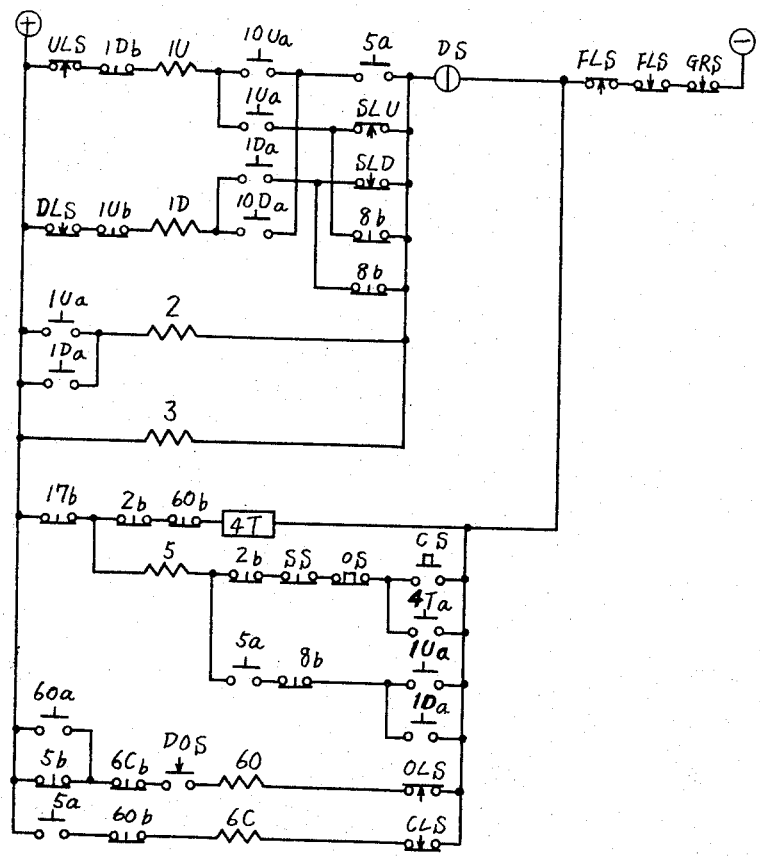

April 9, 1968

ISAO INUZUKA ETAL 3,376,952

ELEVATOR "WILD CAR" SYSTEM IN WHICH ONE CAR
IS ALWAYS THE WILD CAR

Filed Oct. 17, 1963

5 Sheets-Sheet 1

INVENTORS
Isao Inuzuka
Kikuo Watanabe

By Paul M. Craig, Jr.

ATTORNEY

United States Patent Office

3,376,952
Patented Apr. 9, 1968

3,376,952
ELEVATOR "WILD CAR" SYSTEM IN WHICH ONE CAR IS ALWAYS THE WILD CAR
Isao Inuzuka and Kikuo Watanabe, Katsuta-shi, Japan, assignors to Hitachi, Ltd., Tokyo, Japan, a corporation of Japan
Filed Oct. 17, 1963, Ser. No. 316,925
Claims priority, application Japan, Oct. 19, 1962, 37/45,611
5 Claims. (Cl. 187—29)

This invention relates to controlling operation of a group of elevators. It is customary to install a group of elevators to obtain a required handling capacity as a single elevator has only a limited capacity. In operation of a group of elevators, response to car calls, which are made by pressure of car floor buttons, may be in the same manner as with the case of operation of a single elevator. However, in connection with response to landing calls, various problems are involved. Firstly, separate operation of the individual elevators, which employs a set of landing buttons for each elevator unit, is uneconomical as it requires provision of a landing-call detecting device on each unit. Also, it is common for waiting passengers to press landing buttons provided for the respective elevators trying to be served as early as possible. On this occasion, the first car reaching the calling floor is started with the passengers, cancelling only the landing-call signal registered for the car. In this case, however, the landing calls for all the other cars remain registered causing them to serve the same floor as in this case, all the elevators are controlled independently of each other. This means a considerable amount of idle car operation and a limited overall efficiency of the elevator group.

Secondly, in case a set of landing buttons are provided common to all the elevators to send operation signals thereto all at the same time, arrival of any one car at the calling floor cancels all the registered signals preventing any other car from travelling to serve the floor. In this case, however, since the elevators are not coordinated for their operation in any manner and at all times are ready to respond, any signal registration causes a number of cars to start operation and the elevator system can have only a limited overall operation efficiency.

In view of the above, in another control system, landing calls at each floor are registered on all of the elevators in the group and, if a landing call is registered when all the cars are standing at the main parking floor, one particular car is preferentially dispatched in response to the call. Subsequently, when the particular car (which will be referred to hereinafter as main cage) is on the trip through other floors, another standing car is dispatched only in response to calls back of the main car, i.e., up landing calls from the lower floors during the up trip of the main car or up and down landing calls from the upper floors during the down trip of the main car. This system is capable of controlling a group of elevators with high efficiency but is costly and usable only with high-class elevators.

The present invention is intended to provide an elevator control system particularly suitable for controlling a group of relatively simple elevators for use in lower buildings.

Briefly, in the control system of the invention, the direction of car travel is detected on the cars for answering the car and landing button calls. Response to the car calls is similar to that in operation of a single elevator. The car in service, which will be referred to hereinafter as the "main car," corresponds to what is sometimes referred to in the art as a "wild car." Those landing calls requesting a car trip in a direction opposite to that in which the main car is set are answered by any other car standing at the main parking floor while those landing calls requesting a service in the same direction as that in which the main car is set are left unanswered and all cars other than the main one are prevented from answering it for a predetermined period of time. Also, even when the main car is set in the same direction as that of car travel requested by the landing call, another car is dispatched if due to some failure the main car remaining set in the same direction of travel is standing still after lapse of a predetermined time.

The present invention will now be described with reference to the accompanying drawings, which illustrate the circuit arrangement of an automatic elevator control system embodying the invention and including a pair of elevators installed in a six-storied building.

Figure 2:
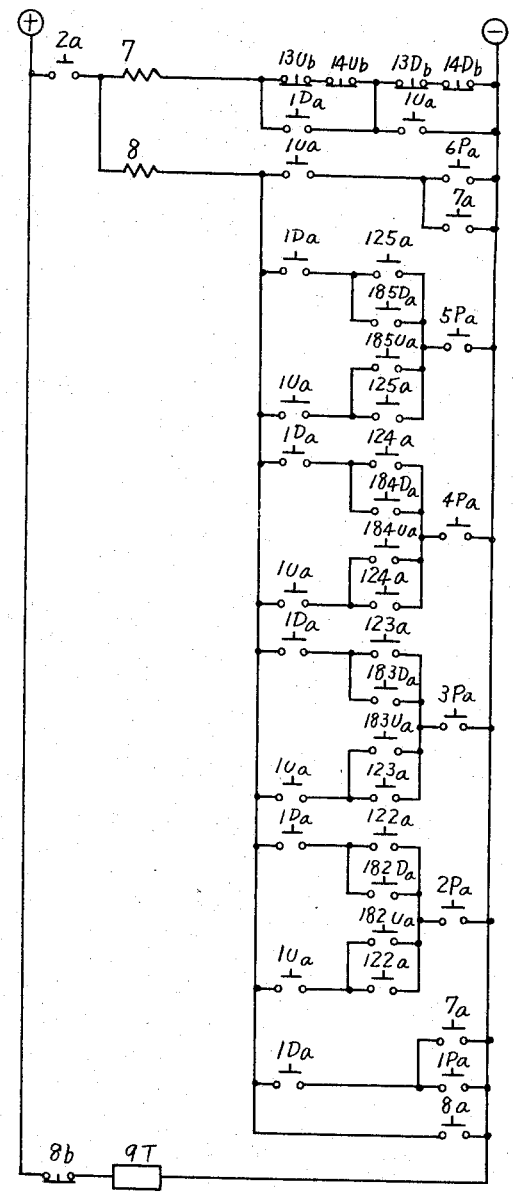
Figure 3:
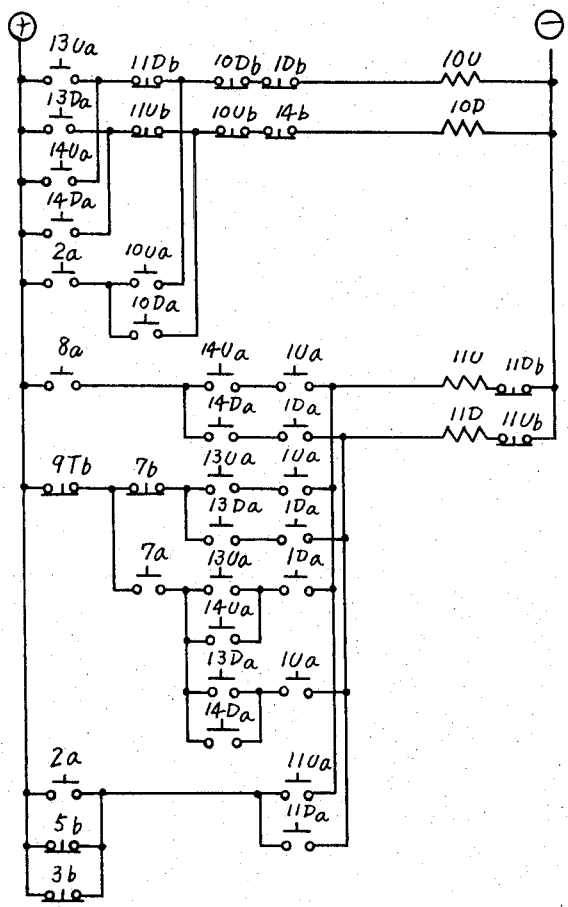
Figure 4:
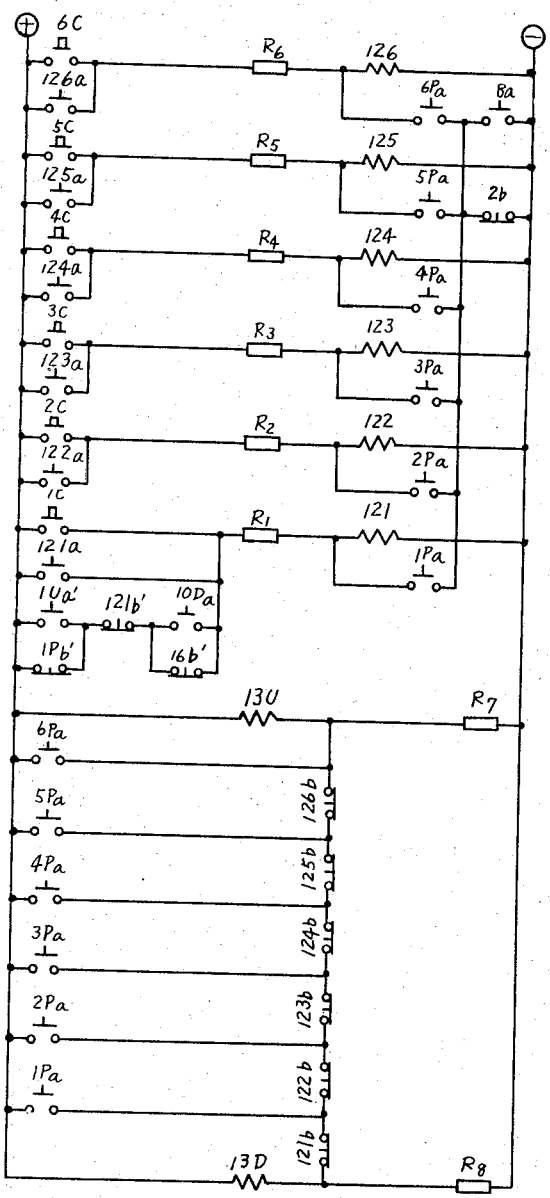
Figure 5:
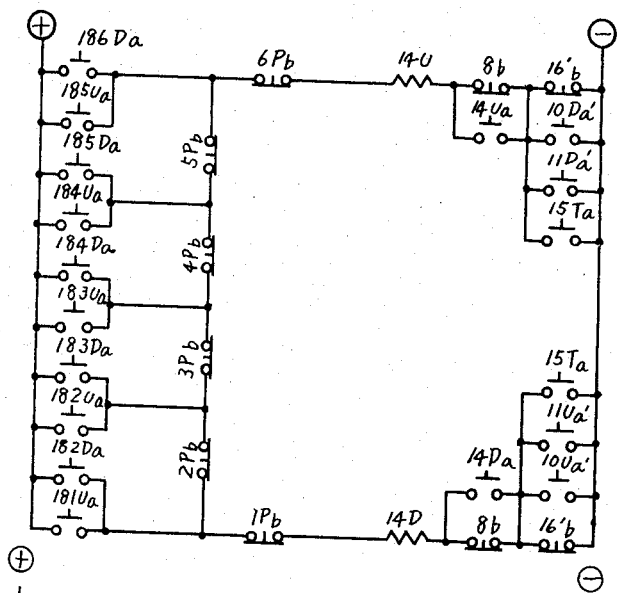
Figure 6:
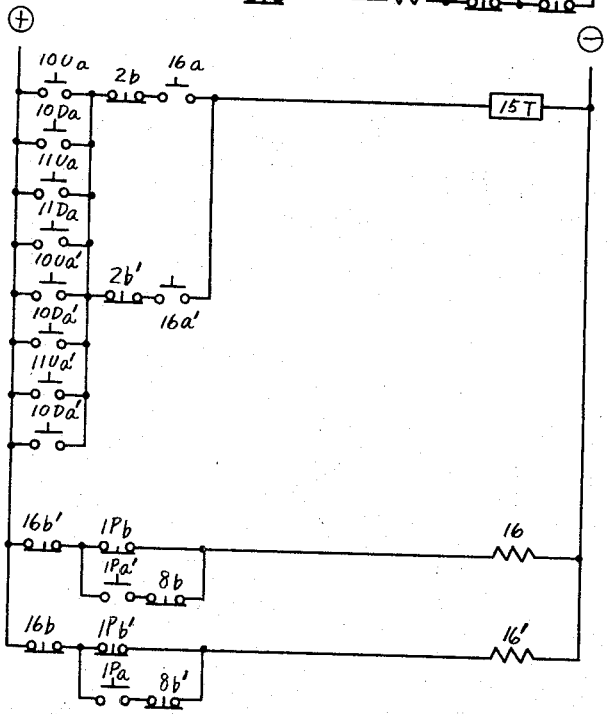

In the drawings:
FIG. 1 is a diagram of the main control circuit of the system;
FIG. 2 is a diagram of the stop-ready circuit;
FIG. 3 is a diagram of the circuit for instructing the direction of travel;
FIG. 4 is a diagram of the circuit for direction selection by car calls;
FIG. 5 is a diagram of the circuit for direction selection for response to the landing call;
FIG. 6 is a diagram of the car selection and aid circuit. The circuits illustrated are those equipped for each car.

Referring first to FIG. 1, illustrating the main control circuit of the system, reference character 1U designates an up trip main contactor; 1D a down trip main contactor; 2 an auxiliary operating contactor; 3 a door contactor; 4T a time limit relay for door closing, which acts to close contacts 4Ta in a time of the order of 5 seconds when energized. Reference character 5 designates an auxiliary contactor for door closing; 60 a door-opening contactor; 6C a door-closing contactor; ULS an up limit switch; DLS a down limit switch; and SLU and SLD up and down stop switches, respectively, for intermediate floors, which are opened only in the up and down stop positions. DS designates a door switch which is held closed with the door closed and is opened with the door opening motion; FLS a final limit switch; GRS an overspeed preventing switch; and SS a door safety switch. The last three switches are normally closed. OS and CS are switches operable by pressure of a door-opening and a door-closing button in the car, respectively. CLS indicates a door-closing limit switch, and DOS a door-opening position detector switch operable to close in the door opening position at each floor.

In the stop-ready circuit shown in FIG. 2, reference numeral 7 indicates a call absence detector switch, 8 a stop-ready contactor, and 9T an auxiliary stop-ready relay. In the circuit for instructing the direction of travel shown in FIG. 3, 10U an auxiliary up trip contactor, 10D an auxiliary down trip contactor, 11U an up direction indicating contactor, and 11D a down direction indicating contactor. In the circuit for direction selection by car calls shown in FIG. 4, reference characters 1C–6C, designate floor buttons in the car, numeral figures 1–6 indicating the respective destination floors. 121–126 indicate car call register contactors, suffix figures 1–6 indicating the respective destination floors. $R_1$–$R_8$ designate short-circuit preventing resistances, 13U a car-call up-direction contactor and 13D a car-call down-direction contactor. In the circuit for direction selection by landing calls shown in FIG. 5, 14U indicates a landing-call up-direction contactor and 14D a landing call down-direction contactor. In the car selection and aid circuits shown in FIG. 6; 15T is an aid time limit relay, and 16A, 16B main car selecting contactors for elevator units A and B, respectively.

Description will next be made on those contacts which form no part of the invention and the contactor coils for which are omitted in the drawings for simplicity's sake. A door-reopening contactor contact 17b is opened only when the car is at rest at a certain floor and the landing button for the floor is held pressed and is otherwise closed. Position contactor contacts 1Pa–6Pa and 1Pb–6Pb are arranged so that for example when the car is at the first floor the contacts 1Pa and 2Pb–6Pb are closed while 1Pb and 2Pa–6Pa are open. When the car is run from the first to the second floor, the coils are energized at a preset level intermediate the floors to open 1Pa and 2Pb while closing 1Pb and 2Pa. 181Ua–185Ua designate up landing signal contactor contacts at the first to fifth floors, respectively, and 182Da–186Da down landing signal contactor contacts at the second to sixth floors, respectively.

The operation of the control system is as follows. In most cases, the main car is standing at any one of the six floors while the other cars are standing at the main parking floor, which is assured to be the first floor in this explanation. First, assume that the two cars are both standing at the main parking floor waiting passengers. In this case, the main car detecting contactor 16 or 16' in the car selecting circuit of FIG. 6 is thrown in to complete a circuit ⊕—16'b—1P'a—8b—16—⊖ or $$\oplus\text{---}16b\text{---}1Pa\text{---}8'b\text{---}16'\text{---}\ominus$$

If 16 is thrown in to select elevator unit A as a main elevator, 16b is opened so that main car detecting contactor 16' for unit B is not thrown in. In the circuit for direction selection by landing calls shown in FIG. 5, 181Ua–185Ua and 182Da–186Da are all in an open state with no landing calls registered and landing-call up- and down-direction contactors 14U and 14D are not thrown in. Similarly, in the circuit for direction selection by car calls shown in FIG. 4, button switches 1C–6C in the car are open causing no car calls and contacts 1U'a and 1P'b are also open holding the car call register contactors 121–126. Under these circumstances, car-call up- and down-direction contactors 13U and 13D are held open by the short-circulating through the respective circuits including $$\oplus\text{---}1Pa\Bigg\langle\begin{matrix}122B\text{---}123b\text{---}124b\text{---}125b\text{---}126b\text{---}R_r\\121b\text{---}R_s\end{matrix}\Bigg\rangle\ominus$$

Accordingly, in the circuit for instructing the direction of travel of FIG. 3, auxiliary up- and down-trip contactors 10U and 10D are held open with contacts 13Ua, 13Da, 14Ua and 14Da opened. Also, up- and down-direction indicating contactors 11U and 11D are not thrown in because of the opening of contacts 1Ua, 1Da, 2a, 5b and 3b and hence no indication of the next direction of travel. In the main control circuit of FIG. 1, up and down contactors 1U and 1D are not thrown in because of the opening of contacts 10Ua and 10Da. Accordingly, the auxiliary operation contactor 2 is also not thrown in. Also, with the door-closing time limit relay 4T closed in the circuit of ⊕—17b—2b—60b—4T—FLS—GRS—⊖, the relay contact is closed at the end of the preset time limit of the relay and the auxiliary door-closing contactor 5 is thrown in to complete the circuit of $$\oplus\text{---}17b\text{---}5\text{---}2b\text{---}SS\text{---}OS\text{---}4Ta\text{---}FLS\text{---}GRS\text{---}\ominus$$

The closing of the contact 5a of the contactor 5 completes the circuit including $$\oplus\text{---}5a\text{---}60b\text{---}6C\text{---}CLS\text{---}FLS\text{---}GRS\text{---}\ominus$$

to throw in the door-closing contactor 6C and the door is closed. At the end of the door closing operation, door-closing limit switch CLS is opened to open contactor 6C. The door closing causes the door switch DS to complete a circuit of ⊕—3—DS—FLS—GRS—⊖ and door contactor 3 is thrown in. Further, in the stop-ready circuit of FIG. 2 with contact 2a opened, the call absence detecting contactor 7 and stop-ready contactor 8 are not thrown in with its contact 8a remaining open to hold the auxiliary stop-ready time limit relay 9T in thrown condition. Also, the time limit relay 15T in the aid circuit of FIG. 6 is in open state. In the above, the manner in which elevator unit A remains standing at the first floor with the door closed has been explained. The other unit B also remains standing with its door closed in quite the same manner as unit A.

It is assumed that under this situation, in which both cars are standing at the first floor with their doors closed, a passenger at the fourth floor presses an up landing call button. First, up-direction landing contactor 184U (not shown) at the fourth floor is thrown in closing its contact 184Ua in the FIG. 5 circuit. Thus, landing-call up-direction contactor 14U is thrown in to complete a circuit $$\oplus\text{---}184Ua\text{---}5Pb\text{---}6Pb\text{---}14U\text{---}8b\text{---}16'b\text{---}\ominus$$

However, with the contact 16b opened in the circuit not shown for unit B, the landing-call up-direction contactor 14U' for unit B is not thrown. Upon throwing in of contactor 14U, the contact 14Ua in the circuit of FIG. 3 is closed to complete a circuit of $$\oplus\text{---}14Ua\text{---}11Db\text{---}10Db\text{---}1Db\text{---}10U\text{---}\ominus$$

so that the up-trip auxiliary contactor 10U is thrown in to issue a directive for up trip. At the same time the up contactor 1U in the circuit of $$\oplus\text{---}ULS\text{---}1Db\text{---}1U\text{---}10Ua\text{---}$$
$$5a\text{---}DS\text{---}FLS\text{---}GRS\text{---}\ominus$$

is thrown in and holds itself maintaining the circuits of $$\oplus\text{---}ULS\text{---}1Db\text{---}1U\text{---}1Ua\Bigg\langle\begin{matrix}SLU\\8b\end{matrix}\Bigg\rangle DS\text{---}FLS\text{---}GRS\text{---}\ominus$$

causing car A to start to rise. On this occasion, the door-closing auxiliary relay 5 holds itself by completion of the circuit of $$\oplus\text{---}17b\text{---}5\text{---}5a\text{---}8b\text{---}1Ua\text{---}FLS\text{---}GRS\text{---}\ominus$$

and the auxiliary operation contactor 2 is thrown in to complete the circuit of $$\oplus\text{---}1Ua\text{---}2\text{---}DS\text{---}FLS\text{---}GRS\text{---}\ominus$$

the thrown condition of the contactor 2 is sustained even when contacts 2b and 4Ta are opened. In the circuit of FIG. 3, the up-trip auxiliary contactor 10U self-holds maintaining the circuit of $$\oplus\text{---}2a\text{---}10Ua\text{---}10Db\text{---}10b\text{---}10U\text{---}\ominus$$

In this fashion, car A rises from floor to floor to reach a preset level intermediate the third and the fourth floor when the position contact 4Pa in the FIG. 2 circuit is closed to complete a circuit of $$\oplus\text{---}2a\text{---}8\text{---}1Ua\text{---}184Ua\text{---}4Pa\text{---}\ominus$$

so that stop-ready contactor 8 is thrown in closing its contact 8a to self-hold. At the same time, contact 8b is opened to release the self-holding of the door-closing auxiliary contactor 5 in the FIG. 1 circuit. In the FIG. 3 circuit, the contact 8a is closed to complete a circuit of $$\oplus\text{---}8a\text{---}14Ua\text{---}1Ua\text{---}11U\text{---}11Db\text{---}\ominus$$

so that the up-direction indicating contactor 11U is thrown in to self-hold completing a circuit of $$\oplus\Bigg\langle\begin{matrix}2a\\5b\end{matrix}\Bigg\rangle 12Ua\text{---}11U\text{---}11Db\text{---}\ominus$$

and contact 11Ub is opened to open the throwing circuit for down-trip auxiliary contactor 10D, instructing the car of the direction of travel after its arrival at the fourth floor. In this manner, the car is completely prepared for stopping at the fourth floor. Subsequently, the time limit set on the stop-ready auxiliary time limit relay 9T, which has been opened upon opening operation of the contact 8b in the FIG. 2 circuit, expires, its contact 9Tb in the circuit portion not shown being opened to open the landing up signal contactor 184U at the fourth floor. Though the contact 184Ua in the FIG. 5 circuit is thus operated to open contactor 14U, the up-direction is being indicated since, as described hereinbefore, the contactor 11U in the FIG. 3 circuit is held thrown in. Upon arrival of the car at the stop level at the fourth floor, up stop contact SLU in FIGURE 1 operates to open the up contactor 1U while contact 1Ua is operated to open the auxiliary operation contactor 2 causing the car of unit A to stop at the fourth floor. At the same time, door-opening contact DOS is operated to complete a circuit ⊕—5b—6Cb—DOS—60—OLS—FLS—GRS—⊖ and door-opening contactor 60 is thrown in so that the car door starts to open and the door switch DS and door contactor 3 are opened and finally the door-opening limit switch OLS is opened to release the door-opening contactor 60. Upon closing operation of contact 60b, the door-closing time limit relay 4T is energized through the circuit of ⊕—17b—2b—60b—4T—FLS—GRS—⊖ and after lapse of a preset time limit allowing passengers to ride the car, contact 4Ta is closed to complete a circuit of ⊕—17b—5—2b—SS—OS—4Ta—FLS—GRS—⊖ so that the contactor 5 is thrown in. As the result, a circuit of

⊕—5a—60b—6C—CLS—FLS—GRS—⊖ is completed to throw in door-closing contactor 6C and the door is closed. At this time, the stop-ready contactor 8 is in open condition because of the opening operation of the contact 2a in the FIG. 2 circuit.

It is assumed next that the passenger entering the car presses a car button, for example, for the fifth floor. In this case, the floor button contact 5C in the direction selection circuit of FIG. 4 is closed to complete a circuit of ⊕—5C—R₅—125—⊖ and the car-call register contactor 125 is thrown in to self-hold due to the closing of its contact 125a and is not released until the car A reaches the fifth floor to close contact 5Pa. As long as the car remains at the fourth floor with the contact 4Pa closed, the car-call up direction contactor 13U is held released by the short-circuiting in the form of

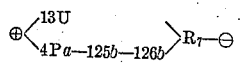

However, upon opening of contact 125b, the contactor 13U is thrown in by completion of the circuit

⊕—13U—R₇—⊖

Upon the closing of contact 13Ua in the circuit for instructing the direction of travel shown in FIG. 3, a circuit of ⊕—13Ua—11Db—10Db—10b—10U—⊖ is completed to throw in the auxiliary up-trip contactor 10U so that in the main control circuit of FIG. 1 the up contactor 1U is also thrown in to start rise of the car. When the car reaches the setting level short of the fifth floor, the position contact 5Pa is closed to open the car-call register contactor 125 for the fifth floor and the car-call up-direction contactor 13U in the FIG. 4 circuit. At the instant when the contact 5Pa in the stop-ready circuit of FIG. 2 is opened, the contact 125a is in closing position completing a circuit of ⊕—2a—8—1Ua—125a—5Pa—⊖ so that the stop-ready contactor 8 is thrown in to cause the car to stop and the door is again opened. The door is closed upon termination of the time limit set on the door-closing time limit relay 4T. The car A remains at the fifth floor until the next call is registered.

In the event that the above landing call at the fourth floor is not an up call but a down call, the system operates as follows. In this case, the up-direction contactor 14U in the direction selection circuit shown in FIG. 5 is thrown in irrespective of whether the call is for an up trip or for a down trip, causing the car A to rise in the manner described hereinbefore. However, even when the car reaches the stop-ready level for the fourth floor and contacts 1Ua and 4Pa are opened in FIG. 2, it does not stop at the floor since the call is in a direction opposite to that of car travel and thus the stop-ready contactor 8 is not thrown in. The car thus continues to rise until it reaches the stop-ready level for the highest or sixth floor when a circuit of ⊕—2a—801Ua—6Pa—⊖ is completed to throw in the contactor 8 causing the car to stop at the sixth floor. In FIG. 5, opening of contact 6Pa due to the car position causes the contactor 14U to open and the down-direction selecting contactor 14D is thrown in. In FIG. 3, contact 14Da is closed to complete a circuit of ⊕—14Da—11Ub—10Ub—1Ub—10D—⊖ so that auxiliary down-trip contactor 10D is thrown in. Accordingly, in FIG. 1, contact 10Da is closed to complete a circuit through ⊕—DLS—1Ub—1D—10Da—5a—DS—FLS—GRS—⊖ so that down-trip main contactor 1D is thrown in to start the car on a down trip. When the car reaches the stop-ready level for the fifth floor, contacts 1Da, 184Da and 4Pa in FIG. 2 are all closed, throwing in the stop-ready contactor 8. As the result, the car stops at the fourth floor and the car door is opened. It descends after the waiting passengers have entered the car. Finally, at the floor where the down trip is completed, car A comes to rest and waits the next call with its door closed.

To summarize the foregoing explanation, the control system of the invention has an important feature (1) that any landing call registered while all the cars are standing at the main parking floor is served by any one of the cars, which remains after the serving trip at the floor of its destination.

Next, it is assumed that a fifth-floor landing updirection call is registered during the operation of unit A as a main car to carry passengers waiting at the third floor to the fourth floor and particularly when unit A rising from the main parking floor is standing at the third floor. Thus, contact 185Ua in the circuit of FIG. 5 is closed by pressure of the landing button with the position contact 3Pb opened. Accordingly, a circuit is completed through ⊕—185Ua—6Pb—14U—8b—16'b—⊖ and the landing-call up-direction contactor 14U is thrown in closing its contact 14Ua in the FIG. 3 circuit to complete a circuit of ⊕—14Ua—11Db—10Db—10b—10U—⊖ so that the up-trip auxiliary contactor 10U is thrown in. As a result, the car A now loaded with passengers from the third floor rises to stop at the fourth floor and the car door is opened. At the end of the time limit set for the door opening, the door is reclosed to complete a circuit of ⊕—ULS—1Db—1U—10Ua—5a—DS—FLS—GRS—⊖ so that the up-trip main contactor 1U is thrown in without delay. The car is thus caused to rise and stop at the fifth floor ready to respond to a further call.

Now it is assumed that a second-floor landing down call is registered when the unit A is standing at the third floor. In the FIG. 5 circuit with contact 182Da closed and contact 3Pb opened, completion of the circuit including ⊕—182Da—1Pb—14D—8b—16'b—⊖ acts to throw in the down-direction selecting contactor 14D. However, since in FIG. 3 contactor 11U is held thrown in and contact 11Ub opened in the tripping circuit for the contactor 10D, the latter cannot be thrown in. Therefore, as described hereinbefore, unit A continues to travel to the fourth floor and, when contactor 10D is thrown in upon cancellation of the up call, the unit starts its down trip from the fourth floor. Also, when contactor 10D is thrown in closing its contact 10Da, the up-direction selecting contactor 14U′ in the direction selection circuit for unit B, which is similar to the FIG. 5 circuit, is thrown in by completion of a circuit of ⊕—182D′a—2P′b—3P′b—4P′b—
    5P′b—6P′b—14U′—8′b—10Db—⊖ thus effecting subsequent operations similar to those described above to cause unit B to start an up trip. Unit A reaching the second floor stops and carries waiting passengers there down to the first floor. Since down-direction call contact 182D at the second floor is set to open upon the car stop at the floor, the contact 14U′ in the circuit for unit B corresponding to that for unit A shown in FIG. 5 is opened and the call absence detecting contactor 7′ in the stop-ready circuit for unit B is thrown in by the circuit of ⊕—2a′—7′—13U′b—14U′b—1U′a—⊖. Upon closing of the contact 7a of the contactor 7′ to complete a circuit of ⊕—2′a—8′—1U′a—7′a—⊖, the stop-ready contactor 8′ is thrown in to operate other circuits so that the car is brought to stop at the nearest floor.

Next, it is assumed that an up call is registered at the second floor landing when unit A set for up travel is standing at the third floor as assumed above.

In this case, contactor 10D is thrown in to start a down trip from the fourth floor only when the car operation to the fourth floor is completed with the contactor 14D in FIG. 5 held thrown in, just as in the preceding case. In this case, however, contactor 14U′ in the direction selection circuit for unit B corresponding to that shown in FIG. 5 is simultaneously thrown in causing unit B to start to rise. Unit B then stops at the second floor responding to the up call and subsequently proceeds to one of the upper floors in response to an entering passenger's directive and after door opening and closing operation remains at the floor as a main car. Unit A comes to stop at a floor nearest thereto under control of the circuit shown in FIG. 2 when unit B stop at the second floor as just described.

At this point, another important feature (2) of the elevator control system of the present invention may be summarized as follows. In case a landing call is registered at any floor other than the main parking floor while unit A is in operation in response to a call, the control system operates in the following manner. (a) If the landing call is one made at a floor ahead of the travelling unit A and requesting a trip in the direction of travel of the unit, it responds to the landing call as soon as its previous operation is completed and then remains standing at the floor called ready to respond to another call. (b) If the landing call is one requesting a trip in a direction opposite to that of travel of the unit A and the latter is on a down trip, unit B starts to rise at the instant to respond to the call and remains at the floor called while the other car comes to stop at the nearest floor. In this case, if unit A is on an up trip, its direction of travel is reversed at the end of its up trip to respond to the call while at the same time unit B starts to rise and stops at the floor nearest thereto when the call is cancelled by unit A. (c) If the landing call is one made at a floor behind the unit A and requesting a trip in the direction of travel of the unit and it is on a down trip, unit B rises in response to the call and remains at the floor called while unit A completing its previous travel starts to rise and stops at the nearest floor as described above. In this case, if the unit A has been travelling upwardly, its direction of travel is reversed at the end of its travel while unit B starts to rise in response to the call and remains standing at the floor called. Unit A comes to stop at the nearest floor in the same manner as described above.

Assume next that a landing call is made at the first floor when the main car, for example, unit A is in operation and resting at the third floor.

As will be readily understood, the unit B has a main control circuit corresponding to one for unit A shown in FIG. 1. Upon opening of the door-reopening contactor contact 17′b, door-closing time limit relay 4T′ and door-closing auxiliary contactor 5′ are opened and contact 5′b is thrown in to complete a circuit of ⊕—5′b—6C′b—DOS′—60′—OLS′—FLS′—GRS′—⊖ so that contactor 60′ is thrown in to open the car door allowing passengers to enter the car. After the closing of the door, if the third-floor button in the car is pressed, push-button switch 3C in the FIG. 4 circuit for unit B is closed independently of unit A and a circuit including ⊕—3C—R₃—123—⊖ is completed to throw in car-call register contactor 123′, which is held by its contact 123′a. Opening of the contact 123′b acts to throw in car-call up-direction contactor 13U′, which has previously been short-circuited by the circuit of ⊕—1P′a—122′b—123′b—124′b—
    125′b—126′b—R₇—⊖

Thus, in the FIG. 3 circuit for unit B, contact 13U′a is closed to complete a circuit of ⊕—13U′a—11D′b—10D′b—1D′b—10U′—⊖ and up-trip auxiliary contactor 10U′ is thrown in. Thus, contact 10U′a in the FIG. 1 circuit for unit B is closed and up contactor 1U′ is thrown in to cause the unit to rise. In other words, (3) even if the main car is set for upward travel and the landing call locking device is in operation, any landing call at the floor where the other car is standing acts to open the door thereof. Therefore, if subsequently a floor button in the car is pressed, it can start on an up trip irrespective of the locking device in response to the car call and after the operation can remain standing at the floor called. The main car also remains at the floor where its trip is completed, ready for further operation.

Further, it is assumed that a landing call is registered at the main parking floor when unit A is standing at any other floor.

From the direction selection circuit shown in FIGURE 4, it will be appreciated that, although the main car usually stands by at a floor after operation as previously explained, it will automatically turn back to the main floor upon certain conditions. The conditions are as follows. If cars other than the main car are not standing by at the main floor or other cars are traveling upwardly (contact 1Pb′ closed or contact 1Ua′ closed) and other cars don't have any car call at the main floor (contact 121b′ closed). Under these conditions, if a landing call is made at the main floor, a circuit will be made up in the main car through 1Ua′–121b′–16ℓ′ or 1Pb′–121b′–16b′

As a result, the main car will turn back automatically to the main floor. As shown by contact 10Da connected in parallel to the contact 16b′, other cars than the main car will all turn back to the main floor when they are traveling downwardly and when the conditions as stated above are satisfied. Therefor it will be appreciated that by this system at least one of the elevator cars in the group will stand by at the main floor consequently providing greater convenience to passengers at the main floor who can use any of the cars standing by at the main floor as shown by contact 17a in FIGURE 1 irrespective of the main car selection system.

In the case mentioned above, unit B immediately responds to the call and remains at the floor called as in the case where such call is registered when unit A is on a trip. On the other hand, unit A starts toward the main parking floor and remains at the nearest floor in the same manner as described above. In general, (4) if a landing call is registered at the main parking floor when the main car is standing at any other floor, any one of the cars standing at the main parking floor operates in response to the call and remains at that floor where its operation is completed while on the other hand the main car immediately starts to return to the main parking floor and stops ready to respond at the nearest floor ahead, to which the main car has been approaching at the instant when the call is answered.

Next, (5) if a landing call is registered at any floor other than the main parking floor when the main car is standing at a certain floor other than the main parking floor, the main car responds to the call and remains at the floor where its travel terminates.

Subsequently, if, for instance, unit B becomes inoperable for some reason or other when unit A is standing at the main parking floor with its door closed and unit B is in operation as a main car, and time limit relay 15T is thrown in by completion of a circuit including

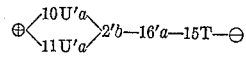

in case unit B is set for upward travel, or a circuit including

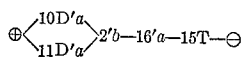

in case unit B is set for downward travel. If unit B remains inoperable even when the time limit set on the relay has expired, contact 15Ta in FIG. 5 is closed and contactor 14U or 14D is thrown in depending upon the nature of the landing call so as to enable unit A to operate. It will be apparent that such aid operation is performed by unit B in case unit A has gone wrong during its operation when unit B is standing at the main parking floor.

Only essential parts of the control system forming the present invention have been illustrated herein, omitting other parts required for practical operation of the elevator equipment. Also, description has been made herein on a group of elevators each having an automatically operated door, but the same results can be obtained with elevators having a manually operated door or a door of combined manual and automatic operation. It will also be appreciated that according to the present invention a set of landing floor buttons and registering devices therefor are provided to serve a group of elevators and their efficient operation can ensure only one of the elevators responding to each landing call.

What is claimed is:

1. An elevator control system for a group of elevator unit comprising up and down landing call means at each floor common to all the elevators in the group, a main car selecting means operable when all the elevator units are standing at the main parking floor to select one of the elevator units as a main car to respond to any landing call and after operation to remain at the last floor called and to respond to any subsequent landing call, and landing call direction selecting means operatively intercoupled with said landing call means and said main car selecting means and operable in conjunction with said main car selecting means in a manner such that all cars other than the main one are made non-responsive to any landing call requesting a service in the same direction as that of travel of the main car in operation and, means for rendering one of the cars other than the main one responsive in case the main car remains not responsive to the landing call after a predetermined time setting has expired, said landing call direction selecting means further including means for rendering one of the cars other than the main one responsive to any landing call requesting a service in a direction opposite to that of travel of the main car in operation, and means for stopping said main car at the nearest landing upon another unit being placed in operation in response to a landing call requesting a service in a direction opposite to that of travel of the main car under circumstances where the main car, car call means have not been actuated and the landing call is answered by another unit.

2. In an elevator control system for plural elevator units having landing call means disposed at each floor for supplying up and down landing calls common to all the elevator units and each unit having a car, car call means located in each car, car call direction selection means for selecting up and down directions in response to car calls, landing call direction selection means for selecting up and down directions in response to said landing calls, and instructing means operably coupled to both said car call and said landing call direction selection means for instructing travel of each elevator car toward a floor intended by passengers; the improvement comprising, main car selecting means operatively coupled to said landing call selection means and to said instructing means for giving a priority in selection to one of said units, said landing call direction selection means including means for responding to both said main car selection means and said instructing means of other units so as to be operable in the selection of direction either when the unit itself is given the priority by said main car selecting means or when other units are in operation toward a different direction from that registered in its landing call direction selection means by the intended passengers, said car-call direction selection means being operable with respect to said instructing means independently of said landing call direction selection means, and means operatively coupled to said instructing means for stopping said main car at the nearest landing upon another unit being placed in operation in response to a landing call requesting a service in a direction opposite to that of travel of the main car under circumstances where the main car, car call means have not been actuated and the landing call is answered by another unit.

3. The system set forth in claim 2 further characterized by means operatively coupled to said instructing means for retaining the main car at the floor selected by the passengers to which it responded after discharge of the passengers and with its doors closed ready for the next landing call.

4. The elevator control system set forth in claim 2 further characterized by means operatively coupled to said instructing means for returning at least one of the elevator units to the main floor after a period of operation wherein all of the elevator units have departed from the main floor.

5. The elevator control system set forth in claim 2 further characterized by means operatively coupled to said instructing means for retaining the main car at the floor selected by the passengers to which it responded after discharge of the passengers and with its doors closed ready for the next landing call, and means operatively coupled to said instructing means for returning at least one of the elevator units to the main floor after a period of operation wherein all of the elevator units have departed from the main floor.

References Cited

UNITED STATES PATENTS

| 2,100,176 | 11/1937 | Waters et al. | 187—29 |
| 2,973,059 | 2/1961 | Hornung | 187—29 |
| 3,236,332 | 2/1966 | Burgy et al. | 187—29 |

ORIS L. RADER, *Primary Examiner.*

T. E. LYNCH, *Examiner.*